(12) United States Patent
Mair et al.

(10) Patent No.: US 8,387,741 B2
(45) Date of Patent: Mar. 5, 2013

(54) DRIVE TRAIN ARRANGEMENT FOR A VEHICLE

(75) Inventors: Ulrich Mair, Friedrichshafen (DE); Thomas Rosemeier, Meckenbeuren (DE); Dietmar Gehring, Aichstetten (DE); Detlef Baasch, Friedrichshafen (DE); Lothar Beigang, Kressbronn (DE); Manfred Geier, Ruderting (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 60 days.

(21) Appl. No.: 13/060,098

(22) PCT Filed: Aug. 26, 2009

(86) PCT No.: PCT/EP2009/060966
§ 371 (c)(1),
(2), (4) Date: Feb. 22, 2011

(87) PCT Pub. No.: WO2010/028945
PCT Pub. Date: Mar. 18, 2010

(65) Prior Publication Data
US 2011/0147109 A1 Jun. 23, 2011

(30) Foreign Application Priority Data
Sep. 12, 2008 (DE) .......................... 10 2008 042 044

(51) Int. Cl.
*B60K 17/16* (2006.01)
(52) U.S. Cl. ........ 180/378; 180/348; 180/384; 180/383; 180/209; 180/352; 180/248; 180/233; 180/246
(58) Field of Classification Search .................. 180/378, 180/348, 384, 383, 209, 352, 248, 233, 246
See application file for complete search history.

(56) References Cited

U.S. PATENT DOCUMENTS

| | | | |
|---|---|---|---|
| 4,422,349 A | 12/1983 | Matsumoto et al. | |
| 4,493,387 A * | 1/1985 | Lake et al. | 180/248 |
| 4,721,011 A * | 1/1988 | Kubo et al. | 74/665 T |
| 5,086,867 A * | 2/1992 | Hirota et al. | 180/248 |
| 5,226,860 A * | 7/1993 | Baxter et al. | 475/206 |
| 7,051,619 B1 * | 5/2006 | Morgillo | 74/607 |
| 7,530,421 B2 * | 5/2009 | Mori et al. | 180/248 |
| 7,798,503 B2 * | 9/2010 | McLaughlin et al. | 280/93.51 |
| 2002/0108793 A1 * | 8/2002 | Timoney et al. | 180/24.08 |
| 2003/0111285 A1 * | 6/2003 | Gansloser et al. | 180/233 |
| 2005/0096174 A1 | 5/2005 | Mair | |
| 2008/0099267 A1 | 5/2008 | Ruehle et al. | |

FOREIGN PATENT DOCUMENTS

| | | |
|---|---|---|
| DE | 30 36 445 C2 | 7/1987 |
| DE | 103 20 254 A1 | 11/2004 |

(Continued)

*Primary Examiner* — Tashiana Adams
*Assistant Examiner* — Marlon Arce
(74) *Attorney, Agent, or Firm* — Davis & Bujold, PLLC

(57) ABSTRACT

A drive train arrangement for a vehicle comprising a main transmission and a transfer box which are both housed within a transmission housing. The transfer box comprises a drive output which is connected to a rear axle differential transmission and connectable, by a torque transmission element and a connecting shaft, to a front axle differential transmission. The connecting shaft is arranged at a predetermined angle relative to the drive output shaft of the main transmission. The end of the connecting shaft, facing toward the front axle differential transmission, is actively connected to the front axle differential transmission. The front axle differential transmission is fixed to the vehicle by at least one adaptor device allowing the front axle differential transmission to be adapted to a variety of arrangement positions along the rotation axis of the connection shaft.

11 Claims, 4 Drawing Sheets

FOREIGN PATENT DOCUMENTS

| | | |
|---|---|---|
| DE | 20 2004 018 036 U1 | 1/2005 |
| DE | 10 2006 043 048 A1 | 3/2008 |
| EP | 1 321 328 A2 | 6/2003 |
| EP | 1 914 105 A2 | 4/2008 |
| JP | 8-093492 A | 4/1996 |

* cited by examiner

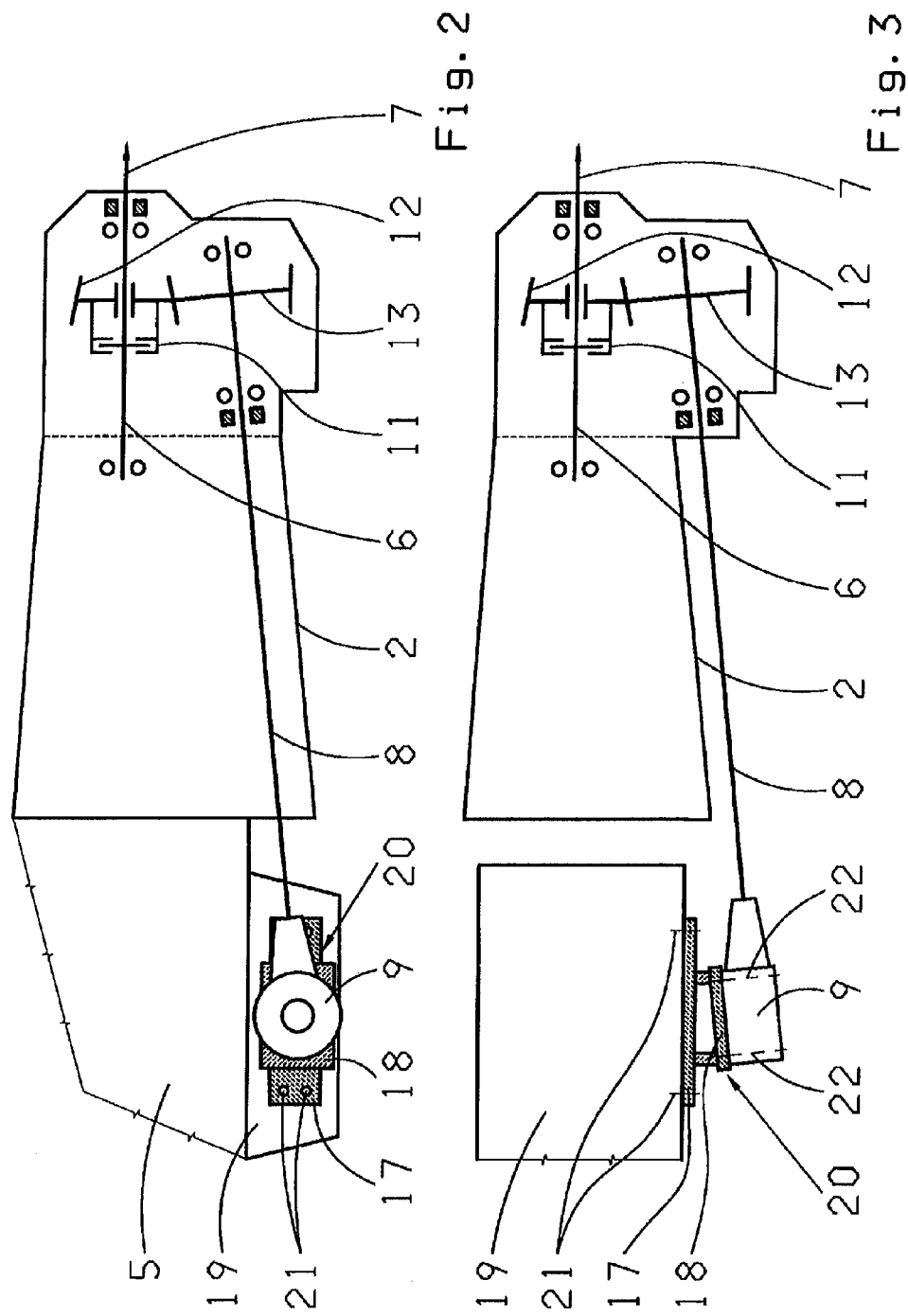

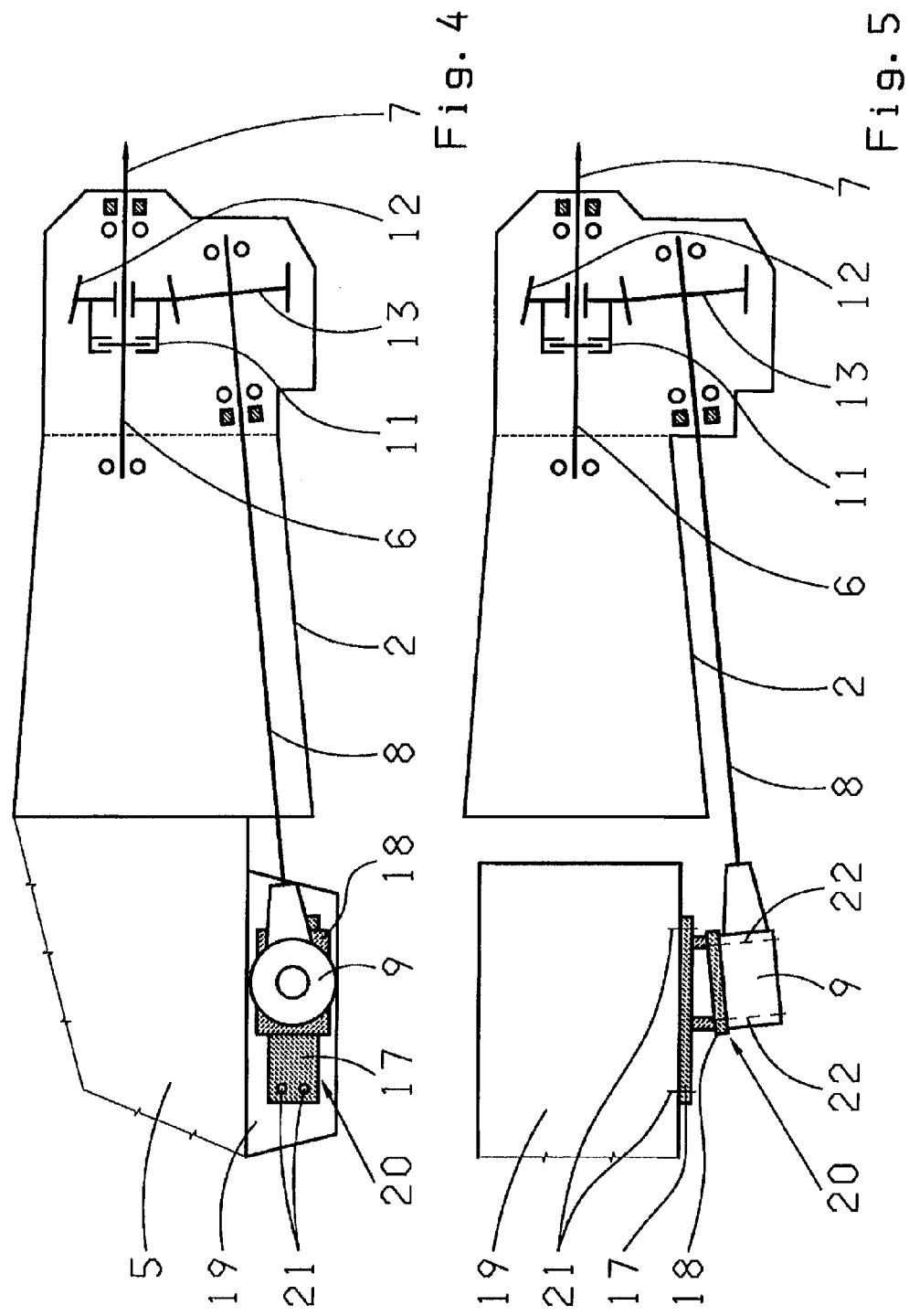

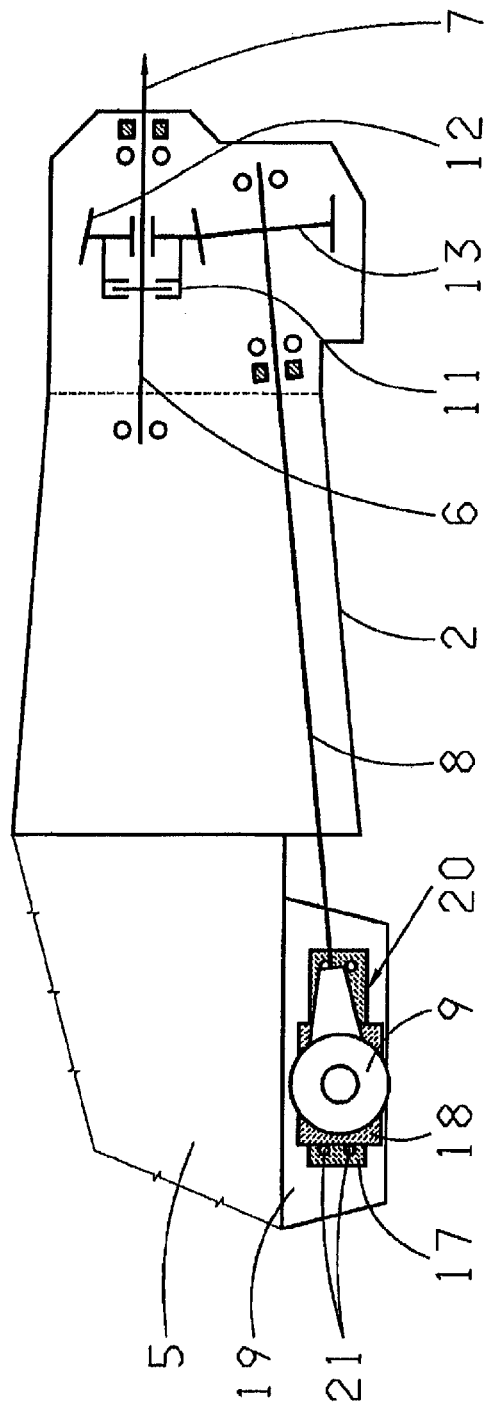
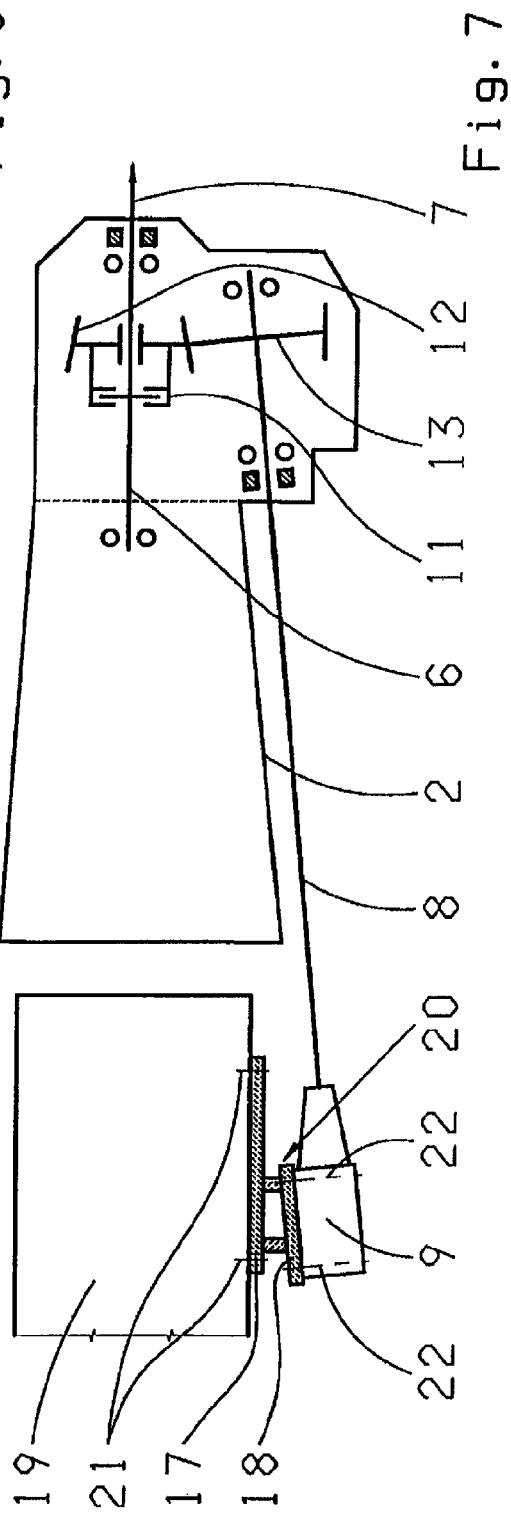

DRIVE TRAIN ARRANGEMENT FOR A VEHICLE

This application is a National Stage completion of PCT/EP2009/060966 filed Aug. 26, 2009, which claims priority from German patent application serial no. 10 2008 042 044.1 filed Sep. 12, 2008.

FIELD OF THE INVENTION

The present invention concerns a drive train arrangement for a vehicle.

BACKGROUND OF THE INVENTION

From the document DE 30 36 445 C2 a transmission for vehicles with four-wheel drive is known. This known automatic transmission gearbox is connected downstream from a motor vehicle engine, such that the transmission gearbox is connected by its first output shaft to a driveshaft for the rear axle and by its second output shaft to a driveshaft for the front axle. The drive power for the front wheel drive is provided by a connection mechanism.

Furthermore, from the document DE 20 2004 018 036 U1 another drive train for a motor vehicle is known. In this known drive train, the engine is positioned in front of the rear axle and behind the front axle. The drive output shaft of the engine extends to the rear and is coupled by a friction clutch arrangement to an automatic transmission. The drive output of the automatic transmission is permanently connected by a gearwheel stage to an inclined shaft. At the end of the inclined shaft on the drive output side, spur gearing is provided, which is in permanent engagement with a driving gearwheel of the rear axle transmission. In this known drive train the front axle transmission on the front axle of the vehicle is not driven, so no all-wheel operation is possible with this vehicle.

In contrast, from DE 10 2006 043 048 A1 a drive train arrangement for all-wheel-drive motor vehicles is known. The known drive train arrangement comprises a first axle permanently driven by a drive engine via the transmission of the motor vehicle, and a second axle which can optionally be switched into the drive flow by a clutch and a lateral shaft. The clutch in the transmission housing is arranged on the drive output shaft of the motor vehicle transmission. In this known drive train arrangement the drive input and drive output shafts of the vehicle transmission are arranged offset relative to one another. This increases the structural fitting space required for the vehicle transmission. Moreover, the lateral shaft comprises a plurality of articulations, whereby in addition the necessary fitting space and the number of components are large with this known drive train arrangement.

SUMMARY OF THE INVENTION

The purpose of the present invention is to modify a drive train arrangement of the type indicated at the start, in such manner that despite a more compact and weight-minimized structure of the drive train arrangement it can be used in a variety of ways even in vehicles designed in different ways.

Accordingly, a drive train arrangement for a vehicle with a main transmission is proposed, in the housing of which a transfer box is integrated, whose drive output is connected to a rear axle differential transmission, such that the drive output of the transfer box can additionally be coupled with a torque transmission element, via a connecting shaft, to a front axle differential transmission, such that the connecting shaft is arranged at a predetermined angle or solid angle relative to the drive output shaft or the input shaft of the main transmission, and such that the end of the connecting shaft that faces toward the front axle differential transmission is in active connection with the front axle differential transmission. According to the invention, to allow for adaptation to a different arrangement position along the rotation axis or centerline of the connecting shaft, the front axle differential transmission is fixed by means of at least one adaptor device onto the vehicle.

Thus, even a displacement of the front axle differential transmission, made necessary by the design of the vehicle, can be compensated for by virtue of the drive train arrangement according to the invention, without for example having to use a further connecting shaft with the corresponding articulations. In this way, depending on the type of the vehicle concerned the arrangement position of the front axle transmission can be changed without having to change the fixing position on the vehicle. By using the adaptor device or a like component with the drive train arrangement proposed according to the invention, the connection of the front axle differential at the solid angle of the connecting shaft predetermined by the design can be adapted in the most simple manner without the cost-intensive production of variants, for example the provision of different housing variants and the use of additional components.

Consequently, the drive train arrangement according to the invention enables the most efficient space-saving, inexpensive and weight-reduced possible connection of the front axle or front axle differential transmission to the drive train.

In one version of the invention, the connecting shaft can for example be a rigid shaft without articulations, such that the active connection between the connecting shaft, arranged in space in a quasi-skewed manner for driving the front axle, and the front axle differential transmission is formed as an angle drive or the like in order to compensate for the different arrangement angles of the connecting shaft and the front axle differential transmission. The necessary compensation in relation to the different arrangement angles of the connecting shaft and the front axle differential is achieved by the angle drive. For example, the connecting shaft can run partially inside the transmission housing. However, other courses of the connecting shaft are also conceivable.

For example, the angle drive can comprise a bevel gear connected to the end of the connecting shaft that faces toward the front axle differential transmission and a spur bevel gear connected to the front axle differential transmission, which mesh with one another. The bevel drive so formed enables the desired connection between the front axle or front axle differential transmission and the connecting shaft. Other types of angle drive too can be used to form the angled connection between the connecting shaft and the front axle differential.

Preferably, the adaptor device can comprise for example at least one base element and at least one holding element. The base element can be fixed onto the vehicle in order to establish the vehicle-side attachment position of the front axle differential transmission. The holding element, however, can be arranged on the base element variably or movably, in order to adapt the arrangement position of the front axle differential transmission to the predetermined arrangement angle of the connecting shaft.

For example, the base element of the adaptor device can be attached firmly and thus permanently onto the engine housing or on the transmission housing or on the oil sump of the vehicle. The holding element forms, as it were, the variable part of the adaptor device in order to vary the arrangement position of the front axle differential transmission, since it is arranged movably on the base element, for example along the rotation axis of the connecting shaft. Thus, the final fixing position of the base element and front axle differential can advantageously be established during the assembly of the drive train arrangement, since the spatial arrangement of the front axle differential transmission can be varied at any time thanks to the movable position of the holding element.

In the drive train arrangement according to the invention it can, for example, be provided that the drive output of the transfer box integrated in the main transmission can be coupled by means of the torque transmission element to a beveloid drive. By using a beveled drive, an angled arrangement of the connecting shaft can be produced, which extends at least partially into the transmission housing.

The beveled drive can for example comprise two bevel gears or the like, a first bevel gear being arranged as a loose wheel coaxially with the drive output of the transfer box and a second bevel gear being connected to the connecting shaft. Preferably at least one clutch, for example a friction clutch or a disk clutch or the like can be used as the torque transmission element. To control the drive power at the front axle differential transmission appropriately, the clutch is connected on one side to the first bevel gear and on the other side to the drive output of the transfer box. Other force transmission means too are conceivable for the drive train arrangement according to the invention. Possibly, only a front-wheel drive can also be realized, and there too the rigid connecting shaft and, for example, the adaptor device for fixing the front axle differential transmission onto the vehicle can be used.

BRIEF DESCRIPTION OF THE DRAWINGS

Below, the present invention is explained in more detail with reference to the drawings, which show:

FIG. 2: a schematic side view of the drive train arrangement with an adaptor device for fixing the front axle differential transmission onto the vehicle in a standard arrangement position;

FIG. 3: a schematic plan view of the drive train arrangement according to FIG. 2;

FIG. 4: a schematic side view of the drive train arrangement with the adaptor device for fixing the front axle differential transmission onto the vehicle in a rear arrangement position;

FIG. 5: a schematic plan view of the drive train arrangement according to FIG. 4;

FIG. 6: a schematic side view of the drive train arrangement with the adaptor device for fixing the front axle differential transmission onto the vehicle in a forward arrangement position; and FIG. 7: a schematic plan view of the drive train arrangement according to FIG. 6.

DETAILED DESCRIPTION OF THE PREFERRED EMBODIMENTS

Figure 1:
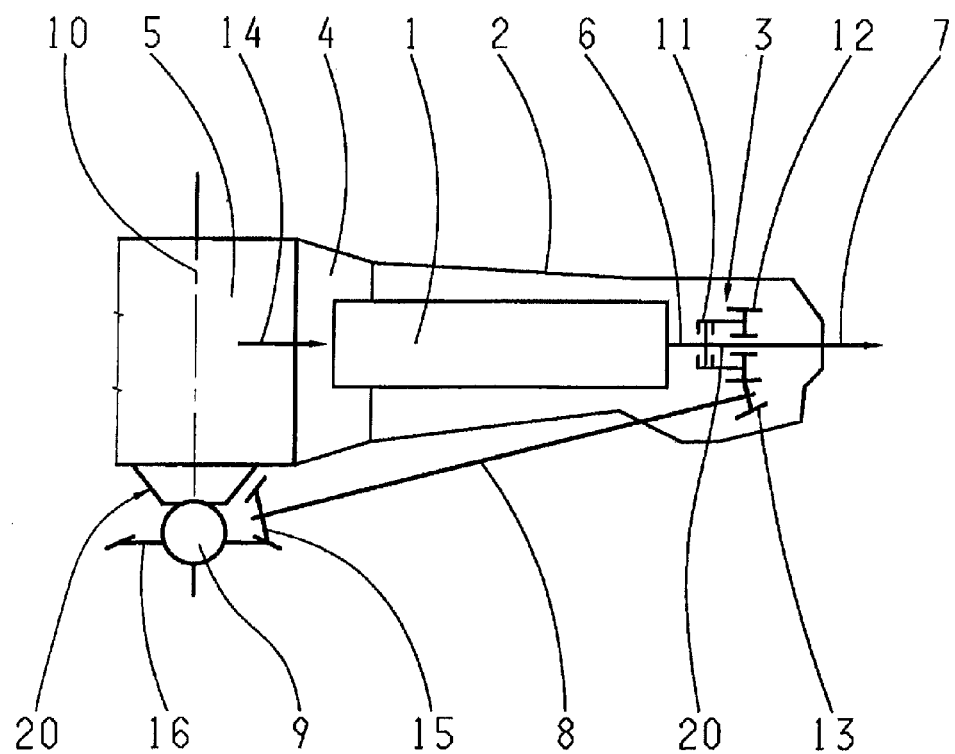
FIG. 1: a schematic side view of a possible embodiment variant of a drive train arrangement according to the invention, with a rigid shaft connected to a front axle differential transmission.

The figures illustrate a possible embodiment variant of a drive train arrangement according to the invention for a vehicle with a main transmission 1, in whose transmission housing 2 a transfer box 3 is integrated, chosen as an example. With the drive train arrangement according to the invention, for example a controllable all-wheel drive but also a purely rear-wheel drive or front-wheel drive can be provided.

FIG. 1 shows as an example a drive train arrangement for a controllable all-wheel drive system in a vehicle. The drive train comprises the main transmission 1, which is coupled to a drive engine 5 by a starting element 4 for torque transmission. The drive output shaft 6 of the main transmission 1 is connected to a shaft of the transfer box 3. The drive output of the transfer box 3 is connected permanently to a rear axle differential transmission indicated only schematically by an arrow 7. Furthermore, the drive output of the transfer box 3 can also optionally be coupled, via a torque transmission element, to a connecting shaft 8 for driving a front axle differential transmission 9 or a front axle 10. The torque transmission element is in the form of a disk clutch 11.

The clutch 11 is connected on one side to the drive output of the transfer box 3 and on the other side to a first bevel gear 12 of a bevel drive. The first bevel gear 12 is arranged as a loose wheel coaxially with the drive output of the transfer box 3, and meshes with a second bevel gear 13 which, in turn, is connected to the connecting shaft 8. By virtue of the bevel drive the connecting shaft 8 is arranged at a predetermined angle relative to the drive output shaft 6 of the main transmission 1 or to the transmission input shaft, which is indicated only by an arrow 14. The connecting shaft 8 extends at least partially into the transmission housing 2.

The connecting shaft 8 is made for example as a rigid shaft and therefore has no articulations. The skewed arrangement of the connecting shaft 8 and different arrangement angles of the connecting shaft 8 and the front axle differential transmission 9 resulting therefrom are compensated for by the fact that the active connection between the connecting shaft 8 and the front axle differential transmission 9 is in the form of an angle drive.

As can be seen from FIG. 1, as the angle drive a bevel drive for example can be used, which comprises a bevel gear 15 and a spur bevel gear 16 that meshes with the bevel gear 15. The bevel gear 15 is connected to the end of the connecting shaft 8 that faces toward the front axle differential transmission 9. The spur bevel gear 16 is connected to the front axle differential transmission 9. Thus, the end of the connecting rod 8 positioned askew in space is directly connected to the front axle differential transmission 9, without articulation. The front axle differential transmission 9 is attached to the vehicle on the drive engine 5 by means of an adaptor device 20 indicated only schematically.

FIGS. 2 to 7 show further schematic views of the drive train arrangement according to the invention, which represent various arrangement positions of the front axle differential transmission on the vehicle. Since the spatial arrangement position of the front axle differential transmission 9 can vary depending on the vehicle, the angle deviation in the drive train arrangement according to the invention is compensated for by using the adaptor device 20 for fixing the front axle differential transmission 9 onto the vehicle.

The adaptor device 20 comprises a base element 17 and a holding element 18. The base element 17 is connected firmly to the vehicle and determines the fixing position on the vehicle. For this, fixing elements 21 are used. Preferably, the base element 17 can be fixed onto an oil sump 19 of the vehicle, for example bolted or cast onto it. It is also possible for the base element 17 to be fixed to the engine housing or even on the transmission housing.

The holding element 18 serves to hold the front axle differential 9, but can be positioned variably on the base element 17, i.e. it can be moved along the rotational axis of the connecting shaft 8. For this, any suitable type of fixing means can be used that makes it possible to orientate the front axle differential transmission 9 appropriately relative to the connecting shaft 8. Thereby, the holding element 18 enables a variable arrangement position of the front axle differential transmission 9 in space. However, the front axle differential transmission 9 is for example connected fixed to the holding element 18 by means of corresponding fastening elements 22.

In the drive train arrangement according to the invention the connection of the front axle differential 9 to the vehicle can be adapted to the arrangement position dictated by the type of vehicle without additional components. This eliminates the need for otherwise necessary housing variants for appropriately fixing the front axle differential transmission, since with the drive train arrangement according to the invention, the fixing position of the front axle differential transmission 9 on the vehicle, determined for the base element 17, can be maintained regardless of the vehicle type concerned. Thus, only one design and structure of the transfer box 3 is needed. It may prove necessary to exchange the connecting shaft 8 and the adaptor in order to allow for length variation.

FIGS. 2 and 3 show, as examples, the front axle differential transmission 9 in a standard arrangement position; FIG. 2 shows a side view of the drive train arrangement and FIG. 3 a plan view of it.

In FIGS. 4 and 5 the front axle differential transmission 9 is shown fixed by the adaptor device 20 in a rear arrangement position. Particularly from the plan view in FIG. 5 it is clear that only the holding element 18 with the front axle differential transmission 9 fixed on it is displaced in the vehicle direction to the rear or along the axis of the connecting shaft 8. The base element 17, of the adaptor device 20, however, advantageously remains in the position where it is fixed on the oil sump 19 of the vehicle.

Finally, FIGS. 6 and 7 show a forward arrangement position of the front axle differential transmission 9 on the oil sump 19 of the vehicle. In this arrangement position of the front axle differential transmission 9, the holding element 18 of the adaptor device 20 has to be moved forward in the vehicle direction. This can be seen particularly clearly in FIG. 7. In this arrangement position too the base element 17 remains in its attached position on the oil sump 19 of the vehicle.

In addition, FIGS. 2 to 7 illustrate schematically the mounting of the drive output of the transfer box 3 and the connecting shaft 8 in the transmission housing 2.

INDEXES

1 Main transmission
2 Transmission housing
3 Transfer box
4 Starting element
5 Drive engine
6 Drive output shaft
7 Active connection to the rear axle
8 Connecting shaft
9 Front axle differential transmission
10 Front axle
11 Clutch
12 First bevel gear
13 Second bevel gear
14 Transmission input shaft
15 Bevel gear
16 Spur bevel gear
17 Base element
18 Holding element
19 Oil sump
20 Adaptor device
21 Fixing element for the base element
22 Fixing element for the front axle differential transmission onto the holding element

The invention claimed is:

1. A drive train arrangement for a vehicle comprising:
a main transmission (1) and a transfer box (3) which are housed within a transmission housing (2),
the transfer box (3) comprising a drive output being connected to a rear axle differential transmission and being connectable by a torque transmission element, via a connecting shaft (8), to a front axle differential transmission (9),
the connecting shaft (8) being arranged at a predetermined angle relative to the drive output shaft (6) of the main transmission (1),
an end of the connecting shaft (8), facing toward the front axle differential transmission (9), being actively connected to the front axle differential transmission (9), and
the front axle differential transmission (9) being fixed to the vehicle by at least one adaptor device (20), the at least one adaptor device being securable to the vehicle at a variety of positions along a rotational axis of the connection shaft so as to facilitate variable positioning of the front axle differential transmission (9) with respect to the rotational axis of the connection shaft (8).

2. The drive train arrangement according to claim 1, wherein the connecting shaft (8) is a rigid shaft and the active connection between the connecting shaft (8) and the front axle differential transmission (9) is an angle drive.

3. The drive train arrangement according to claim 2, wherein the angle drive comprises a bevel gear (15) connected to the end of the connecting shaft (8) facing toward the front axle differential transmission (9), and a spur bevel gear (16) connected to the front axle differential transmission (9), and the bevel gear (15) meshing with the spur bevel gear (16).

4. The drive train arrangement according to claim 1, wherein the drive output of the transfer box (3) is couplable to a bevel drive by the torque transmission element.

5. The drive train arrangement according to claim 4, wherein the bevel drive comprises first and second bevel gears (12, 13), the first bevel gear (12) is arranged as a loose wheel coaxially with the drive output of the transfer box (3) and the second bevel gear (13) is connected to the connecting shaft (8).

6. The drive train arrangement according to claim 1, wherein the torque transmission element is at least one clutch (11).

7. The drive train arrangement according to claim 6, wherein the drive output of the transfer box (3) is couplable to a bevel drive by the torque transmission element, the bevel drive comprises first and second bevel gears (12, 13), and the clutch (11) is connected, on one side, to the first bevel gear (12) and, on an other side, to the drive output of the transfer box (3).

8. A drive train arrangement for a vehicle comprising:
a main transmission (1) and a transfer box (3) which are housed within a transmission housing (2),
the transfer box (3) comprising a drive output being connected to a rear axle differential transmission and being connectable by a torque transmission element, via a connecting shaft (8), to a front axle differential transmission (9),
the connecting shaft (8) being arranged at a predetermined angle relative to the drive output shaft (6) of the main transmission (1), an end of the connecting shaft (8), facing toward the front axle differential transmission (9), being actively connected to the front axle differential transmission (9), the front axle differential transmission (9) being fixed to the vehicle by at least one adaptor device (20) which facilitates variable positioning of the front axle differential transmission (9) with respect to a rotation axis of the connection shaft (8); and wherein the adaptor device (20) comprises a base element (17), on which a holding element (18) for securing the front axle differential transmission (9) at an angle corresponding to the connecting shaft (8), is variably arranged.

9. The drive train arrangement according to claim 8, wherein the base element (17) is fixed to one of an engine housing, the transmission housing (2) and an oil sump (19) of the vehicle.

10. The drive train arrangement according to claim 8, wherein the holding element (18) is arranged on the base element (17) in such a manner that the holding element (18) is movable along the rotation axis of the connecting shaft (8) to vary a position of the front axle differential transmission (9).

11. A drive train of a vehicle, the drive train comprising:

a main transmission (1) comprising a drive output shaft for driving both a transfer box (3) and a rear axle differential transmission, the main transmission (1) and the transfer box (3) being housed within a transmission housing (2), the transfer box (3) comprising a loose gear wheel (12) being coaxial with and releasably engagable, via a shift element (11), with the drive output shaft of the main transmission (1);

a connecting shaft (8) comprising a first bevel gear (13) and a second bevel gear (15), the first bevel gear (13) engaging the loose gear wheel (12) of the transfer box (3), and the connecting shaft (8) rotating about a rotational axis that is at an oblique angle with respect to the drive output shaft of the main transmission (1);

a front axle differential transmission (9) comprising a spur bevel gear (16) engaging with the second bevel gear (15) of the connecting shaft (8);

an adaptor device (20) comprising a base element (17) and a holding element (18), the base element (17) being rigidly fixed to one of the transmission housing (2), a housing of a drive engine (5) and an oil sump (19);

the front axle differential transmission (9) being rigidly fixed to the holding element (18); and the holding element (18) being adjustably fixable to the base element (17) such that the front axle differential transmission (9) being fixable in a variety of positions relative to a rotational axis of the connecting shaft (8).

* * * * *